United States Patent [19]

Arinobu et al.

[11] Patent Number: 4,819,125
[45] Date of Patent: Apr. 4, 1989

[54] OVERCURRENT DETECTOR

[75] Inventors: Ichirou Arinobu; Yoshihiro Hatakeyama, both of Fukuyama, Japan

[73] Assignee: Mitsubishi Denki Kabushiki Kaisha, Tokyo, Japan

[21] Appl. No.: 77,936

[22] Filed: Jul. 27, 1987

[51] Int. Cl.⁴ .................... H02H 3/08; H02H 3/093
[52] U.S. Cl. .......................................... 361/97; 361/93
[58] Field of Search ........................... 361/87, 93–97

[56] References Cited

U.S. PATENT DOCUMENTS

| | | | |
|---|---|---|---|
| 4,131,929 | 3/1978 | Moran | 361/93 |
| 4,623,967 | 11/1986 | Naimer | 361/93 X |
| 4,689,712 | 8/1987 | Demeyer | 361/96 |
| 4,695,961 | 9/1987 | Arinobu | 361/96 X |

FOREIGN PATENT DOCUMENTS

| | | | |
|---|---|---|---|
| 59889 | 9/1982 | European Pat. Off. | 361/93 |
| 0133968 | 3/1983 | European Pat. Off. | |
| 2400094 | 10/1973 | Fed. Rep. of Germany. | |
| 60-32211 | 2/1985 | Japan. | |
| 845706 | 3/1985 | South Africa. | |

Primary Examiner—Derek S. Jennings
Attorney, Agent, or Firm—Lowe, Price, LeBlanc, Becker & Shur

[57] ABSTRACT

A circuit breaker has a phase selecting circuit for selecting one phase among plural phases, in which the largest current flows. After selecting the largest phase, the judgement whether an accidental overcurrent flows or not in executed by using only output signals from the selected largest phase.

22 Claims, 13 Drawing Sheets

OVERCURRENT DETECTOR

FIELD OF THE INVENTION AND RELATED ART STATEMENT

1. Field of the Invention

The present invention relates generally to an overcurrent detector, and more particularly to that which can prevent error operation.

2. Description of the Related Art

FIG. 15 shows a circuit breaker having an overcurrent detector of prior art disclosed in published unexamined Japanese patent application No. Sho 60-32211. In FIG. 15, on a set of power lines, namely R, S and T of three phase power lines 10, current transformers 21, 22 and 23 of a current sensor means 200 are provided, respectively. Full-wave rectifiers 31, 32 and 33 are connected with its two input lines across both output lines of the current transformers 21, 22 and 23, respectively. Full-wave rectifiers 31, 32 and 33 are connected with its two input lines across both output lines of the current transformers 21, 22 and 23, respectively. Burden or load circuits 41, 42 and 43 are connected with their input lines to output lines of the full-wave rectifiers 31, 32 and 33, respectively, and each one of the input lines of the burden circuits 41, 42 and 43 are connected in common to the ground. The other input terminals of the burden circuits 41, 42 and 43 are connected to input terminals of an OR circuit 130, which consists of three diodes 131, 132 an 133, and output terminals of which are connected in common as an output terminals of the OR circuit 130. Adjustable output terminals of the burden circuits 41, 42 and 43, wherefrom output signals can be obtainable in desirably adjusted levels, are connected to input terminals of mean/effective value circuits 91, 92 and 93 of mean/effective value means 90, which are for producing mean values or effective values of the signals from the burden circuits 41, 42 and 43. The output terminals of the mean/effective value circuits 91, 92 and 93 are connected to input terminals of OR circuit 160 which consists of three diodes 161, 162 and 163 and issues output signal to the A/D converter 100. A microcomputer 110 is connected to the output terminal of the A/D converter 100. The output terminal of the OR circuit 130, as a second output terminal of the sensor means 200, is connected to the A/D converter 100 and the microcomputer 110 through a power source circuit 300, which is generally a constant voltage circuit. Furthermore, the second output terminal of the current sensor means 200 is connected to a second level discrimination circuit 140 which, for instance, comprises at least one zener diode. The second level discrimination circuit 140 is connected to a second time-current tripping circuit 150. Output terminals of the microcomputer 110 and the second time-current operating circuit 150 are connected to an output circuit 120 through an OR gate 121. The output circuit 120, for instance, comprising a thyristor, actuates a releasing device 80 for carrying out disconnection of line switches 201, 202 and 203. An indicator 180 is for indicating that the releasing device 80 has operated. The microcomputer 110 comprises a first level discrimination means and a first time-current operating means as is described later herein.

The current sensor means 200 issues from the mean/effective value circuit 90 signals corresponding to mean values or effective values of the current in the power lines R, S and T, and also issues from the OR circuit 130 the second output signals corresponding to peak value of the current in the power line R, S and T. The second output signal of the current sensor means is given through the second level discrimination circuit 140 to the second time-current operating circuit 150. The A/D converter 100 and the microcomputer 110 are fed with a constant voltage D/C current from the power source circuit 300.

When overcurrent(s) flows in the AC power lines 10, output currents of the current transformers 21, 22 and 23, which are coupled to the AC power lines R, S and T of the AC power lines 10, correspondingly produce output currents at predetermined transforming ratios. The output currents are rectified by the full-wave rectifiers 31, 32 and 33, respectively. The rectified output currents of the full-wave rectifiers 31, 32 and 33 are fed to respective burden circuits 41, 42 and 43. The output signals of the burden circuits 41, 42 and 43 are transformed into mean values or effective values thereof by mean/effective value circuits 91, 92 and 93 of the mean/effective value circuit 90. A largest signal among the output signals of the mean/effective value circuits 91, 92 and 93 is given to A/D converter 100. This digital signal is fed to the microcomputer 110. The mirocomputer 110 carriers out level discrimination of digital input signal thereto in accordance with a predetermined program stored in the read-only memory 114 (FIG. 3). Furthermore, based on the results of the level discrimination, a predetermined time-current operation is carried out, thereby to issue an output signal. That is, the microcomputer 110 functions as the first level discrimination means and the first time-current operation means. The above-mentioned time-current operation is carried out, for instance, along the inverse long time-current characteristic of part A of FIG. 5. The output signal issued from the microcomputer 110 is fed to the gate of the thyristor 120, which is then turned on the drive the releasing device 80. Accordingly, the overcurrent indicator 180 indicates the occurrence of the overcurrent and at the same time the releasing device 80 actuates the interrupting connectors 201, 202 and 203. The above-mentioned time-current characteristic of the curves A, B and C are designed by taking account of the capacity of fuses in the up stream part of the power line 10.

On the other hand, the output of the full-wave rectifiers 31, 32 and 33 are delivered to the OR circuit 130 comprising diodes 131, 132 and 133. Since the output terminal of the OR circuit 130 is connected to the second level discrimination circuit 140 which, for instance, comprises at least one zener diode, when one input signal to the OR circuit 130 exceeds the second level, the discrimination circuit 140 gives output signal to the second time-current operating circuit 150, which accordingly carries out necessary time-current operation, and thereby triggers the gate of the thyristor 120. The time-current operation in this case is, for instance, as shown by the part B of the short time current inverse characteristic or the part C of instantaneous time-current characteristic. By the above-mentioned turn-on of the thyristor 120, the output device 80 is actuated, thereby its indicator 180 indicates the kind of the overcurrent and also drives the interruption connectors 201, 202 and 203.

In such prior art circuit breaker, it is necessary to detect the mean/effective value of accidental overcurrent in respective phases and to select the maximum (output of OR circuit) value among the mean/effective values of three phases. Furthermore, if the selected phase frequently changes due to the varying of the input signals of respective phases, the accurate detection of phase difference of the input signal or transmitting of the mean/effective value becomes difficult. Therefore, the circuit becomes complex and expensive and it needs a process for adjusting output level of each circuits.

OBJECT AND SUMMARY OF THE INVENTION

It is an object of the invention to provide an improved overcurrent detector having simple circuitry which provides a very low possibility of error operation.

An overcurrent detector in accordance with the present invention comprises:

current sensor means for the respective phases of AC power lines for detecting a value of current, phase selecting means for selecting one largest output value among secondary output signals corresponding to the current value of each phase of the current sensor means by using a predetermined operating characteristic corresponding to a selected threshold value, signal conversion means for obtaining a mean or an effective value of the secondary output signal of the phase selecting means, and processing means which processes the output signal of the signal conversion means to provide a releasing signal.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Hereinafter, details of the invention is described with reference to the drawings.

Figure 1:
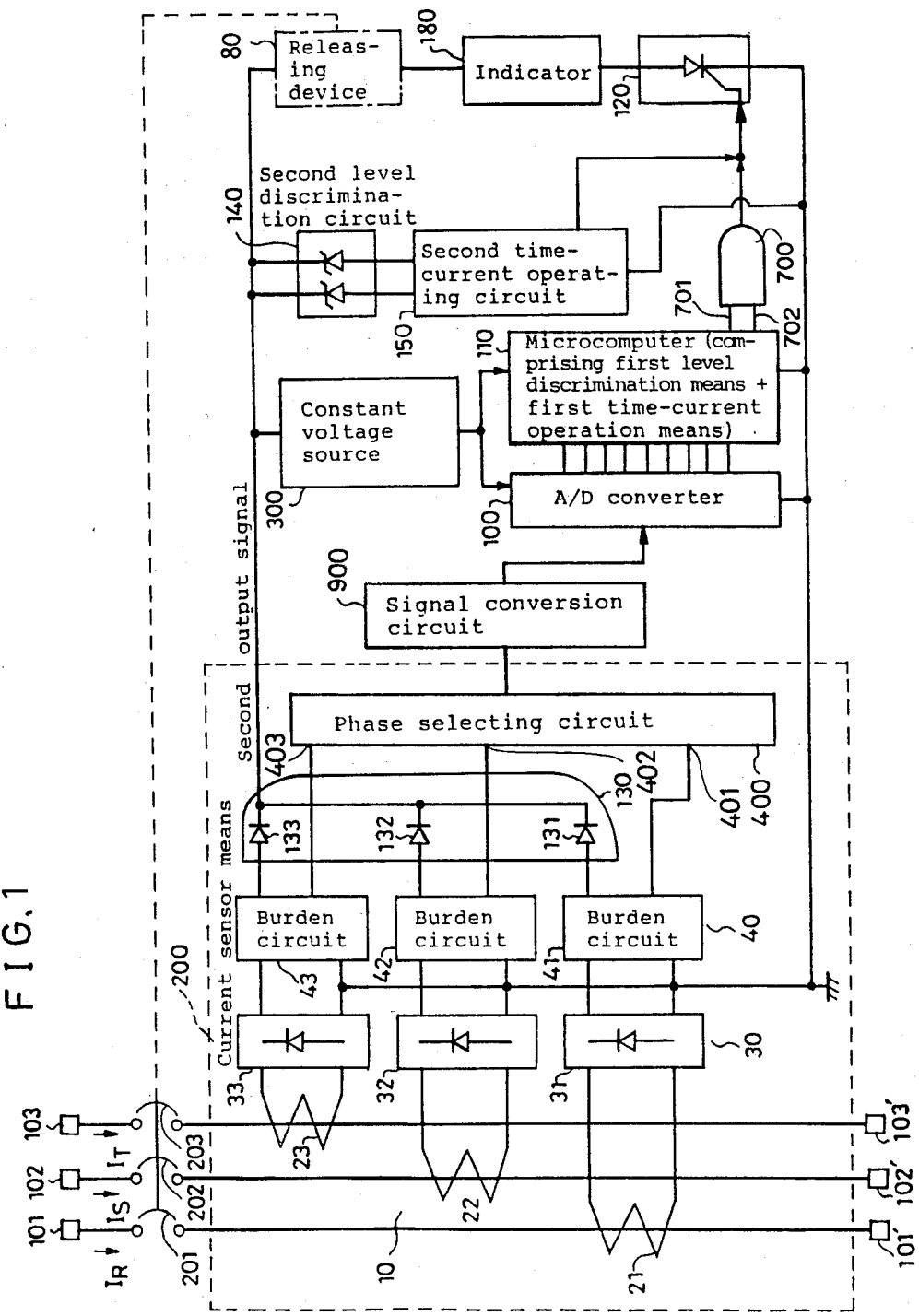
FIG. 1 is a circuit block diagram showing a preferred embodiment of a circuit breaker in accordance with the present invention.

FIG. 1 shows a preferred embodiment of a circuit breaker having an overcurrent detector in accordance with the present invention.

In FIG. 1, on a set of power lines R, S and T of three phase power lines 10, current transformers 21, 22 and 23 of a current sensor means 200 are provided, respectively. Full-wave rectifiers 31, 32 and 33 are connected with their two input lines across both output lines of the current transformers 21, 22 and 23, respectively. Burden or load circuits 41, 42 and 43 are connected to the full-wave rectifiers 31, 32 and 33, respectively, and each one of the input lines of the burden circuit 41, 42 and 43 are connected to input terminals of an OR circuit 130, which consists of three diodes 131, 132 an 133 and output terminal of each of which are connected in common as an output terminals of the OR circuit 130. Adjustable output terminals of the burden circuits 41, 42 and 43, wherefrom secondary output signals can be obtainable in desirably adjusted levels, are connected to input terminals of phase selecting circuit 400 having a predetermined operating characteristic. The phase selecting circuit 400 selects, as the largest phase, a phase which has the largest value in inputted values. The largest phase selected by the phase selecting circuit 400 is connected to a signal conversion circuit 900 for obtaining a mean or an effective value of inputted value. The converted output signal of the signal conversion circuit 900 is converted from analog signal into digital signal by an A/D converter 100. The digital output of the A/D converter 100 is inputted to a microcomputer 110. The output of the microcomputer 110 is connected to a gate of thyristor 120 for operating a releasing device 80. The releasing device 80 actuates the disconnectable contact to disconnect.

The output of an OR circuit 130 is connected to first time-current operation circuit 150 through zener diodes 140. An output of the first time-current operation circuit 150 is connected to the gate of thyristor 120 for operating the releasing device 80. The releasing device 80 disconnects the disconnectable contacts 201, 202 and 203 in response to an on state of the thyristor 120.

Figure 2:
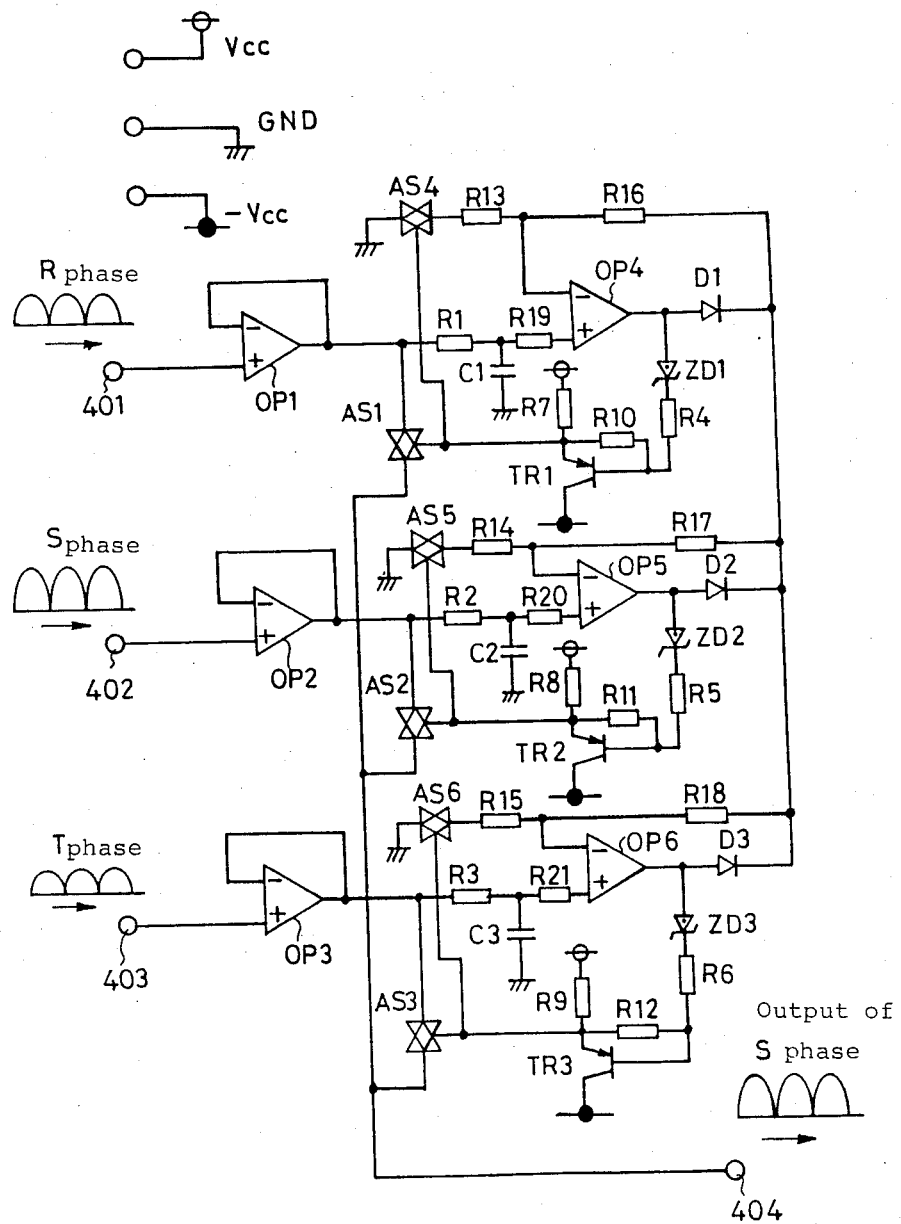
FIG. 2 is a circuit diagram showing a phase selecting circuit 400 of the circuit breaker shown in FIG. 1.

An example of the phase selecting circuit 400 having a predetermined operation characteristic is shown in FIG. 2. Three input terminals 401, 402 and 403 receive output signals from burden circuits 41, 42 and 43 respectively, and output to operational amplifiers $OP_1$, $OP_2$ and $OP_3$. The operational amplifiers serve as unity-gain amplifiers, and respective output terminals are connected to one terminals of resistors $R_1$, $R_2$ and $R_3$ and to input terminals of analog switches $AS_1$, $AS_2$ and $AS_3$. The other terminals of the resistors $R_1$, $R_2$ and $R_3$ are connected to one terminals of capacitors $C_1$, $C_2$ and $C_3$ and to positive input terminals of operational amplifiers $OP_4$, $OP_5$ and $OP_6$, respectively. Output terminals of the operational amplifiers $OP_4$, $OP_5$ and $OP_6$ are connected to anode terminals of diodes $D_1$, $D_2$ and $D_3$, respectively. Cathode terminals of the diodes $D_1$, $D_2$ and $D_3$ are commonly connected with each other to have the same potential, and also connected to negative input terminals of the operational amplifiers $OP_4$, $OP_5$ and $OP_6$ by intermediating through resistors $R_{16}$, $R_{17}$ and $R_{18}$, respectively. The above-mentioned circuit constitutes a detecting circuit for selecting the phase from which the largest output is issued. Output terminals of the operational amplifiers $OP_4$, $OP_5$ and $OP_6$ are connected to anode terminals of diodes $ZD_1$, $ZD_2$ and $ZD_3$, respectively, and cathode terminals of the diodes $ZD_1$, $ZD_2$ and $ZD_3$ are connected to bases of transistors $TR_1$, $TR_2$ and $TR_3$ by passing resistors $R_4$, $R_5$ and $R_6$, respectively. All the transistors $TR_1$, $TR_2$ and $TR_3$ are PNP type transistors, and the collectors of them are connected to negative electric power source -Vcc. Regist ors $R_{10}$, $R_{11}$ and $R_{12}$ are connected between the respective bases and the collectors of transistors $TR_1$, $TR_2$ and $TR_3$, respectively, for applying biasing potential. Registors $R_7$, $R_8$ and $R_9$ are connected to emitters of the transistors $TR_1$, $TR_2$ and $TR_3$, respectively, at one terminal thereof. And the other terminals thereof are commonly connected to positive power source Vcc. The emitters of the transistors $TR_1$, $TR_2$ and $TR_3$ are connected to gate terminals of the analog switches $AS_1$, $AS_2$ and $AS_3$, respectively. Output terminals of the analog switches $AS_1$, $AS_2$ and $AS_3$ are commonly connected to an output terminal 404 of the phase selecting circuit 400. The emitters of the transistors $TR_1$, $TR_2$ and $TR_3$ are connected to the gate terminals of the analogue switches $AS_4$, $AS_5$ and $AS_6$, respectively. One end of the input terminals of the analog switches $AS_4$, $AS_5$ and $AS_6$ are connected to the ground, and the other terminals thereof are connected to negative input terminals of the operational amplifiers $OP_4$, $OP_5$ and $OP_6$ through resistors $R_{13}$, $R_{14}$ and $R_{15}$, respectively. Hereupon, the positive electric power source Vcc, the negative electric power source —Vcc and the ground GND are connected to a power source for driving the operational amplifiers $OP_1$ to $OP_6$ and the analog switches $AS_1$ to $AS_3$.

Figure 3:
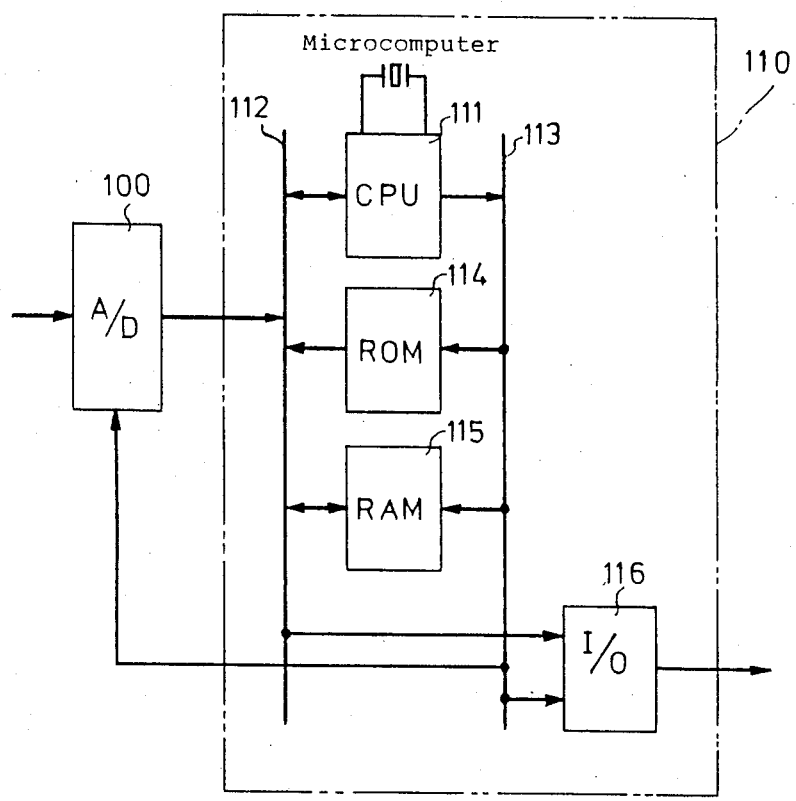
FIG. 3 is a block diagram of a known microcomputer 110.

The constitution and operation of the microcomputer 110 are described with reference to FIGS. 3 and 4 hereafter. FIG. 3 is a circuit block diagram of the microcomputer 110. As shown in FIG. 3, the microcomputer 110 comprises a central processor unit 111, a read-only memory 114, a random-access memory 115, an I/O port 116, a data bus 112 and the address bus 113. Parts of the data bus 112 and the address bus 113 are also connected to the A/D converter 100. The read-only memory 114 stores a program for executing necessary signal processing, and also data for a long time characteristic, a short time characteristic and an instant time characteristic of the first time-current operating means. The central processor unit 111 contains clock signal means necessary therefore. The random-access memory 115 functions as a register which is necessary for the signal processing.

Figure 4:
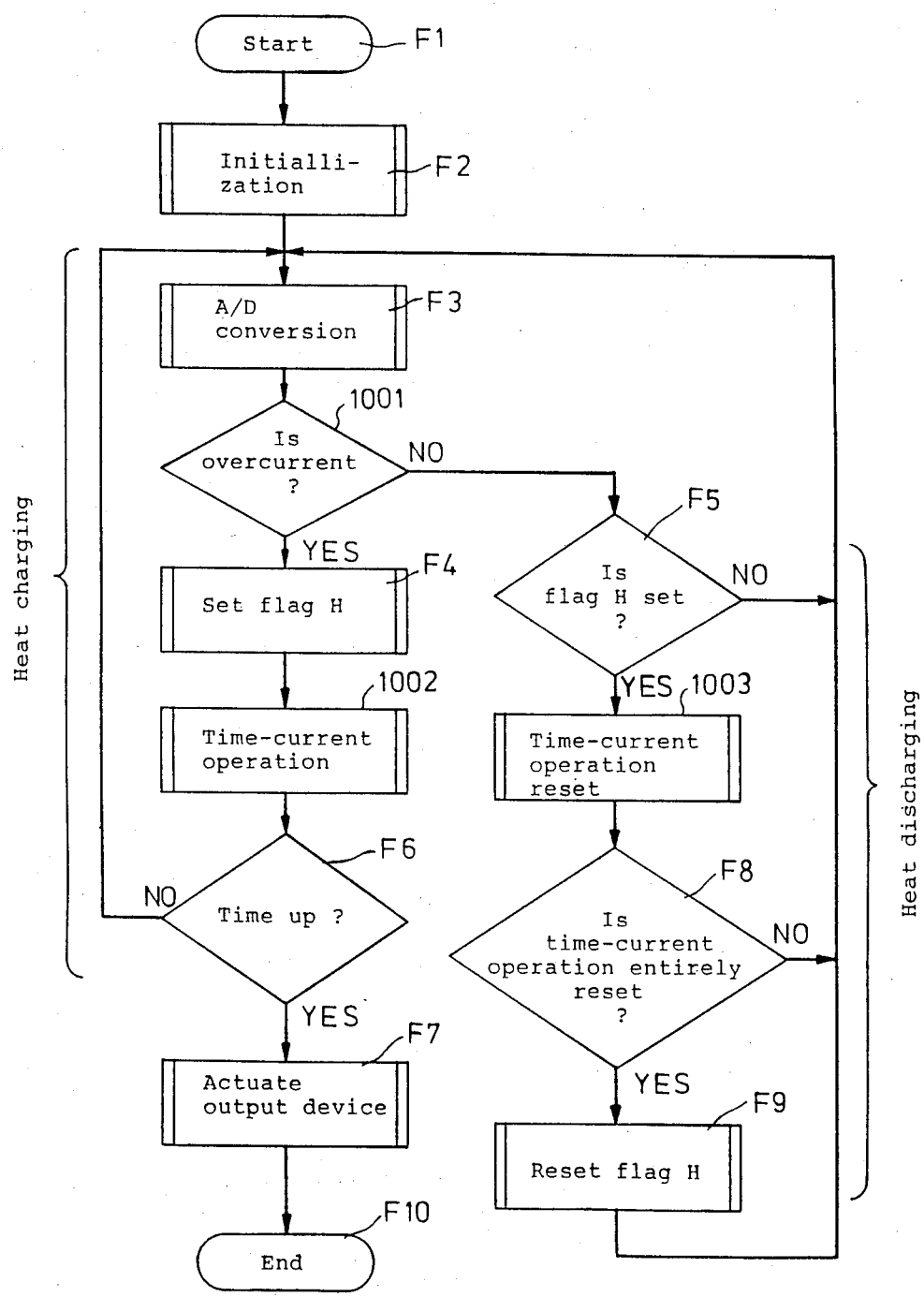
FIG. 4 is a flow chart showing operation of the microcomputer shown in FIG. 3.
Figure 5:
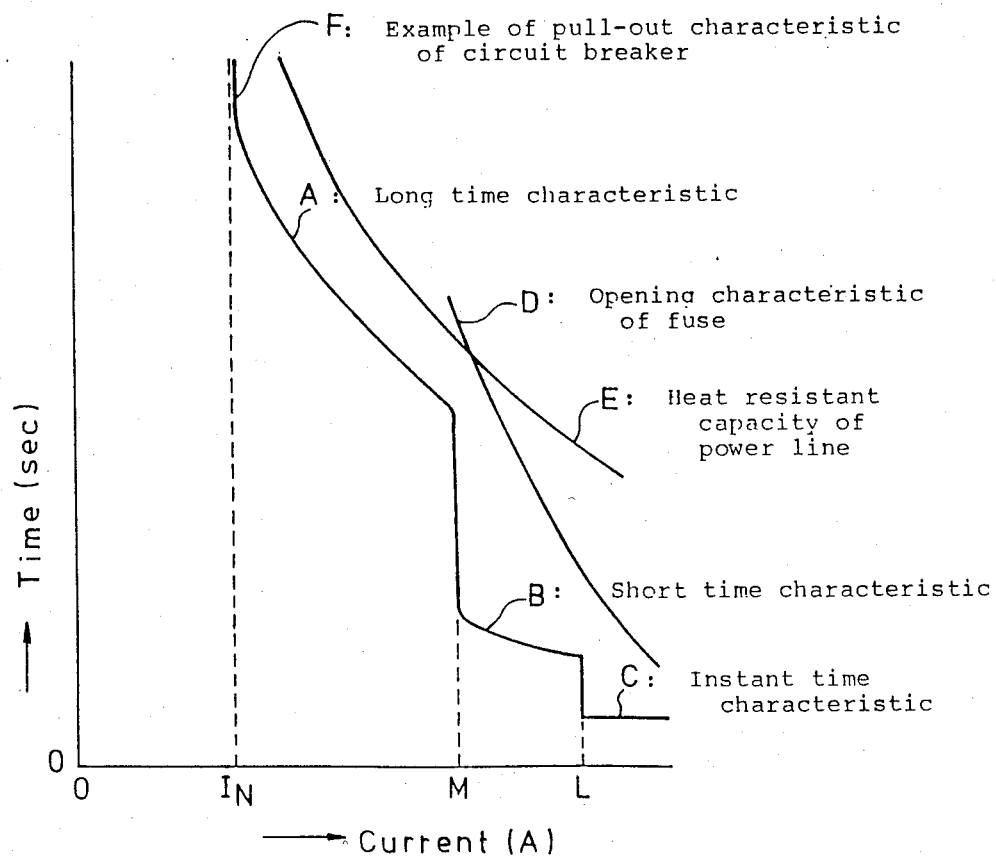
FIG. 5 is the current vs. time characteristic graph of circuit breaker of the prior art.

FIG. 4 is a flow chart of the computer program for the microcomputer 110. The flow chart contains a first level-discrimination step (a step 1001) and a first time-current operating step (a step 1002) for performing a first time-current operation in response to the output of the first level discrimination means. The flow chart also contains decrement means (a step 1003) for decreasing the registor in response to radiation characteristics. Such reset means (the step 1003) operates when at least one of the input signal of the time-current operation (the step 1002) or the second time-current operating a circuit 150 (in FIG. 1) becomes below a predetermined level.

When overcurrent(s) flows in the AC power lines 10, output currents of the current transformers 21, 22 and 23, coupled to the AC power lines R, S and T of the AC power lines 10, correspondingly produces output currents at predetermined transforming ratios. The output currents are rectified by the full-wave rectifiers 31, 32 and 33, respectively. The rectified output currents of the full-wave rectifiers 31, 32 and 33 are fed to respective burden circuits 41, 42 and 43. The outputs of burden circuits 41, 42 and 43 are inputted to the phase selecting circuit 400 which selects, as the largest value phase, a phase which produces the largest value from inputted phases. The selected largest value phase is inputted to the signal conversion circuit 900 and converted into a mean or effective signal. The mean or effective output is fed to the A/D converter 100 which converts the analog signal into digital signal. This digital signal is fed to the microcomputer 110, which carries out a level discrimination step with respect to the digital signal. Further, the microcomputer carries out first time-current operation and issues an output signal from the output port 116. The output signal is fed to the gate of thyristor 120 for driving the releasing device 80 which disconnects the disconnectable contacts 201, 202 and 203.

On the other hand, outputs of the burden circuits 41, 42 and 43 are inputted to OR circuit 130 which consists of the diodes 130, 131 and 132. The output of the OR circuit 130 is connected to the second time-current operating circuit 150 through the zener diodes 140 as second level-discrimination. Therefore, when the output of OR circuit 130 is over a zener voltage of the zener diode 140, the output of OR circuit 130 is fed to the second time current operating circuit 150. The second time-current operating circuit 150 carries out the predetermined second time-current operation for triggering the thyristor 120 for driving the releasing device 80.

When a full-wave signals obtained from the burden circuits 41, 42 or 43 shown in FIG. 1 are given to the input terminals 401, 402 and 403 of the phase selecting circuit 400 shown in FIG. 2 which has a predetermined operation characteristic, the input signals are applied to the input terminals of the analog switches $AS_1$, $AS_2$ and $AS_3$, and the terminals of the registors $R_1$, $R_2$ and $R_3$, through the operational amplifiers $OP_1$, $OP_2$ and $OP_3$ which constitute a unity gain amplifier, respectively. The resistors $R_1$, $R_2$ and $R_3$ and the capacitors $C_1$, $C_2$ and $C_3$ constitute a mean value circuit for obtaining the mean value of the input signals, and obtained mean value signals are entered into the positive input terminals of the operational amplifiers $OP_4$, $OP_5$ and $OP_6$, through the resistors $R_{19}$, $R_{20}$ and $R_{21}$, respectively. The operational amplifiers $OP_4$, $OP_5$ and $OP_6$ and the diodes $D_1$, $D_2$ and $D_3$ constitute the phase selecting circuit for selecting a phase from which the largest mean value among the entered mean values is produced, and the largest mean value is generated on the common cathode of the diodes $D_1$, $D_2$ and $D_3$, and is then connected as feedback to the negative input terminals of the operational amplifiers $OP_4$, $OP_5$ and $OP_6$ through the resistors $R_{16}$, $R_{17}$ and $R_{18}$, respectively. The operational amplifiers to which the largest mean value of the input signal is not fed operate as comparators and their output signals are not inverted and maintained the potential mean to that of the negative electric power source -Vcc because their input signals have lower potentials than the feedback potential. It is now assumed that the largest signal is entered into the input terminal 402 of the S phase in FIG. 2. The operational amplifier $OP_5$ operates as a normal phase amplifier and outputs the mean value as a threshold potential to the negative input terminals of the other operational amplifiers $OP_4$ and $OP_6$ corresponding to other R and T phases intermediating the diode $D_2$ inbetween. Since the input signals entered into the positive input terminals of the operational amplifiers $OP_4$ and $OP_6$ do not reach the threshold potential, the operational amplifiers $OP_4$ and $OP_6$ operate as comparators and their output signals are maintained in potentials near the negative potential of $-V_{cc}$, and the diodes $D_1$ and $D_3$ are maintained in negatively biased state. Accordingly, the diodes $ZD_1$ and $ZD_3$ are also negatively biased and they supply a sufficient base current for driving the transistors $TR_1$ and $TR_3$ of switching operation. Zener voltages of the zener diodes $ZD_1$, $ZD_2$ and $ZD_3$ are selected to be a little lower than the potential electric power source $V_{cc}$, and the emitter levels of the transistors $TR_1$, $TR_2$ and $TR_3$ are set to be lower than the ground potential GND. When the transistors $TR_1$ and $TR_3$ are passed, signals having sufficiently high potential to cut off the positive input signal the analog switches are applied on the gate terminals of the analog switches $AS_1$ and $AS_3$, and therefore the analog switches are turned to cut off state. On the other hand, since the output signal of the operational amplifier $OP_5$ to which the largest input signal is entered has a positive potential in proportion to the input signal, the zener diode $ZD_2$ is in cut off state, the base current is not given to the transistor $TR_2$, and a positive potential is applied to the gate of the analog switch $AS_2$ by intermediating the resistor $R_8$. As a result, only the analogue switch $AS_2$ maintains the conductive state corresponding to the largest input signal and it feeds the output signals on the output terminal 404. In this case, the emitters of the transistors $TR_1$, $TR_2$ and $TR_3$ are connected to the gates of the analog switches $AS_4$, $AS_5$ and $AS_6$, respectively, and therefore a signal of the S-phase corresponding to the largest input signal is applied to the gate of the analog switch $AS_5$, the analog switch $AS_5$ turns to the conductive state, and the potential of the negative input terminal is lowered by the resistor $R_{14}$. Namely the operational amplifier $OP_5$ serves as a positive phase amplifier and the output potential $V_{op}$ of the operational amplifier $OP_5$ is given by the following equation:

$$V_{op} = V_{sin} \times (1 + (R_{17}/R_{14})) \quad (1).$$

Hereupon, $V_{sin}$ is the mean input potential of the S-phase. As a result, only the input signal of a phase corresponding to the largest input signal is raised in proportion to the $(1+(R_{17}/R_{14}))$ shown in the above-mentioned equation (1), and the phase selecting circuit 400 has predetermined operation. Accordingly, by selecting the resistance values of the resistors $R_{14}$ and $R_{17}$, the predetermined potential of the threshold value for selecting the largest selecting phase can optionally be set. In the other phases the circuits are constituted in the same way.

The microcomputer 110 rises up, and then the computer program shown in flow chart of FIG. 4 starts. The system is initialized (i.e. setting of I/O port, and setting/resetting of flags are made,) at a step F2. Then, the microcomputer 110 controls the A/D converter 100 to convert the output signal of signal conversion circuit 90 into digital signal (step F3). This digital data is stored in a RAM 115. Next, it is determined whether this digital data indicate overcurrent or not (step 1001). When the digital data does not show an overcurrent, the operation moves from the heat charging routine to the heat discharging routine and then returns to the A/D conversion (step F3). When the digital data shows an overcurrent, a heat charging flag H is set in the step F4, and bits for heat charging are added for every predetermined unit time by utilizing random access memory 115 or a register in the central processor unit 114, so as to count time responding to amount of input signal level. The heat charging bits are selected in order to realize time-current operation along the characteristic curves of FIG. 2. Then, the added bits number is examined whether the time is up for the selected time-current operation of the predetermined characteristic. And as a result, when the added bits number does not yet reach the predetermined number, in other words, when the time is up, an output is issued through the I/O port 116 to drive the thyristor 120, and thereby to actuate the first indicator 180 and the output device 80.

Nextly, operation of heat discharging routine, namely, the routine for resetting the time-current operation is described. The steps F5, 1003, F8 and F9 together form a heat discharging routine. It is determined whether the heat charging flag H has been set or not (step F5). When the heat charging flag H has been set, the heat charging flag H is decreased at the step 1003 for every predetermined unit times. When the counted number of the bits becomes 0 as a result of the subtractions in the step F9, the heat discharging routine goes back from the step F9 to the A/D conversion step F3. When the counted number of the bits is not entirely reset, the heat charging flag H is not reset and the heat discharging routine goes back from the step F8 to the A/D conversion step F3.

As above-mentioned, the microcomputer provides the most appropriate time-current operating characteristic, taking account of heat charging and heat discharging in the electric power lines and loads. Addition or subtraction of the heat charging and heat discharging can be executed in the inverse order to the above-mentioned embodiment.

Figure 6:
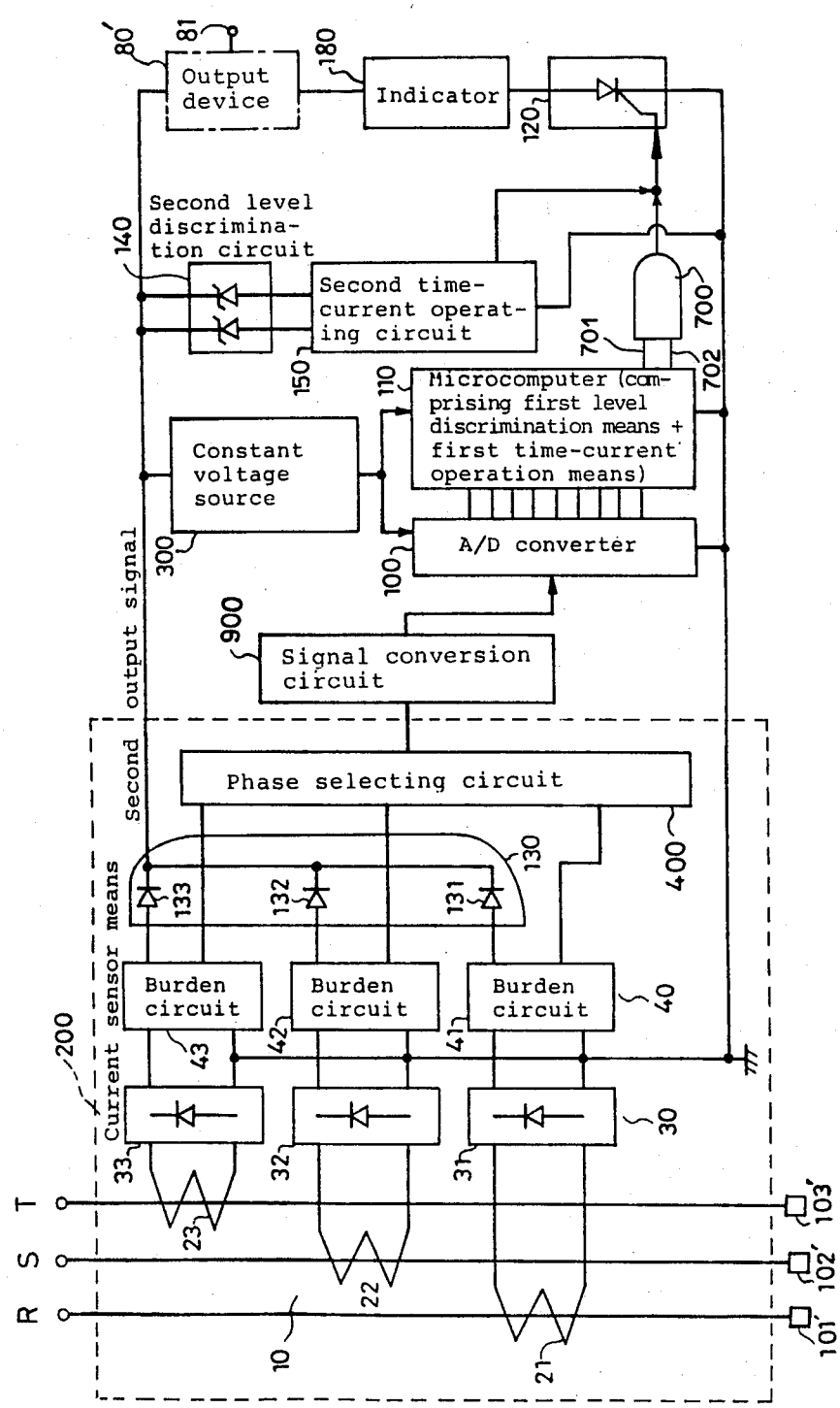
FIG. 6 is a circuit block diagram showing an overcurrent detector in accordance with the present invention.

A preferred embodiment of an overcurrent detector in accordance with the present invention is shown in FIG. 6.

Generally an overcurrent detector serves as a sensor of the afore-mentioned circuit breaker or the like, so the arrangement of components and their relationship are the same to each other. The circuit of FIG. 6 is the same as FIG. 1, except the line switches 201, 202 and 203 and the releasing device 80. In FIG. 6, an output device 80' having an output terminal 81 is replaced with the releasing device 80.

Figure 7:
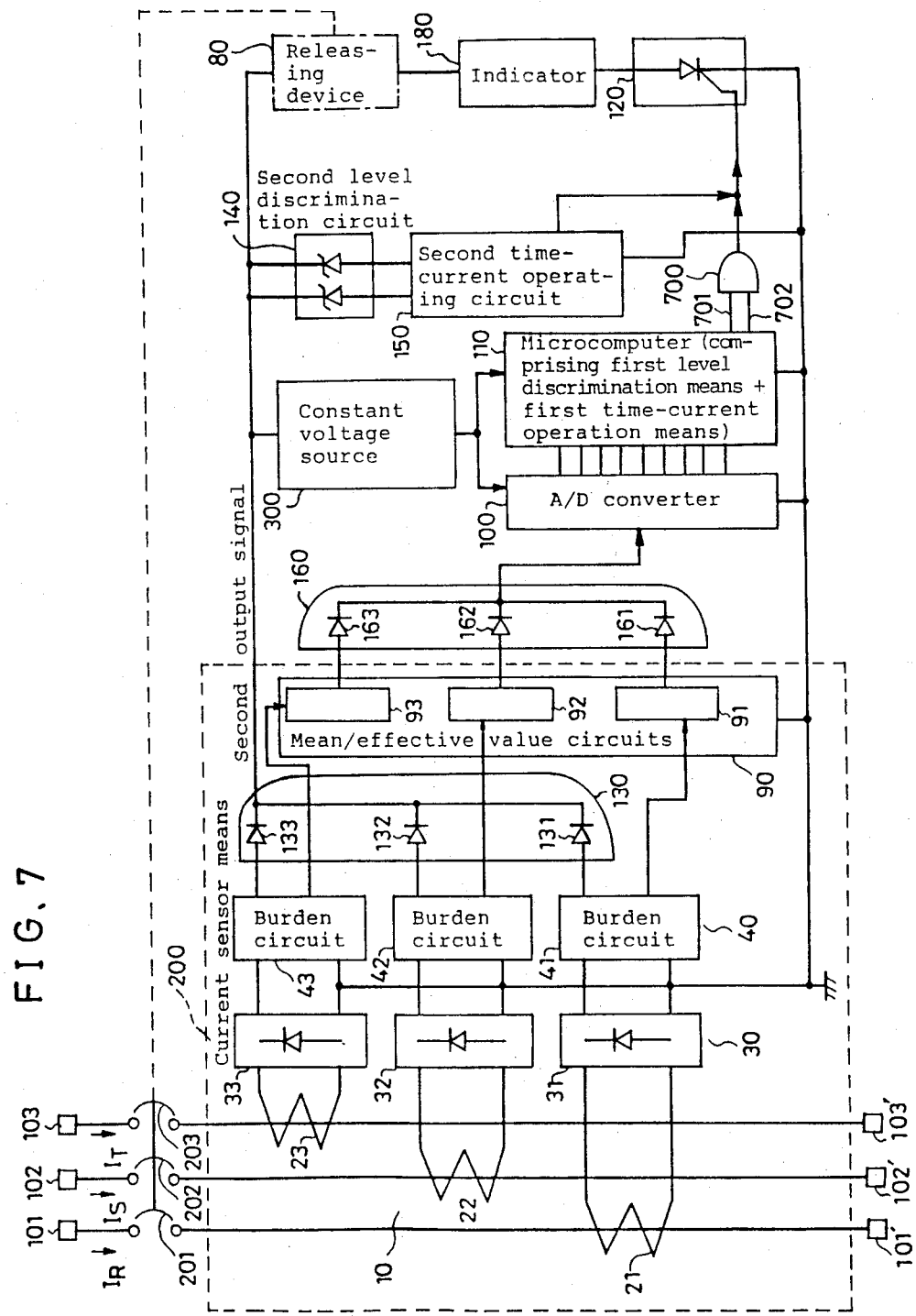
FIG. 7 is a circuit block diagram showing another preferred embodiment of a circuit breaker in accordance with the present invention.
Figure 8:
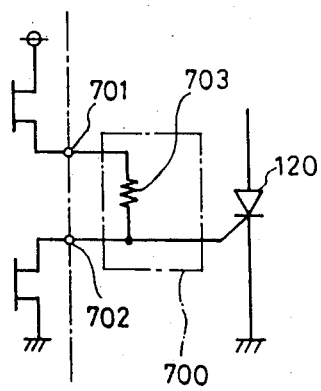
FIG. 8 is a circuit diagram of an AND circuit 403 shown in FIG. 7.
Figure 9:
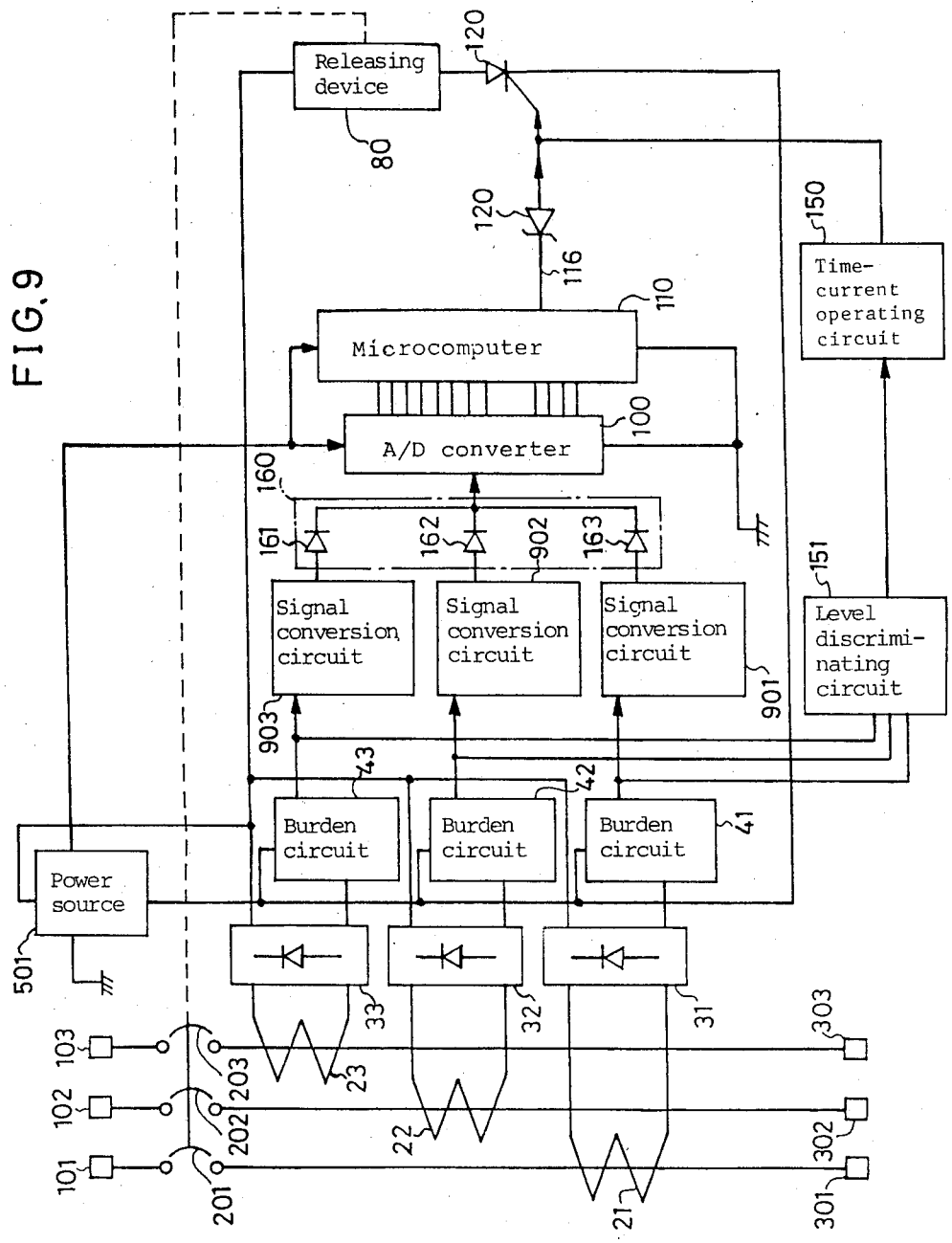
FIG. 9 is a circuit block diagram showing still other preferred embodiment of a circuit breaker in accordance with the present invention.

Another preferred embodiment of a circuit breaker in accordance with the present invention is described as follows with reference to FIG. 7 and FIG. 8.

In this embodiment, the components and their relationships are the same as the above-mentioned embodiment.

The feature of this embodiment is that input terminals 701 and 702 of an AND circuit 700 are connected to the first and second output port of the microcomputer 110. The microcomputer 110 carries out the level discrimination and the time-current operation and issues the output signals to the output port 701 and 702. The AND circuit 700 issues a gate trigger signal to the thyristor 120 for turning on the thyristor 120 when the signals from the microcomputer are entered into both output ports 701 and 702. The AND circuit is constituted by disposing a resistor 703 between the output ports 701 and 702. Hereupon, the output port 701 is P-MOS output and ordinary in LOW level namely in OFF state. The output port 702 is N-MOS output and ordinary in the HIGH level namely in ON state. When an abnormality occurs in the digital operation or in the microcomputer 110 due to the noise or the like and one of the output state of among the output ports 701 and 702 turns over, the AND circuit 700 does not issue any output, therefore the thyristor 120 does not issue any gate trigger signal. And the thyristor 120 triggers only in the case that the output port 701 is ON and the output port 702 is OFF. Hereupon, the resistor 703 prevents to flow overcurrent when both output ports 701 and 702 are in ON state.

By the way, in this embodiment, the output ports 701 and 702 of the microcomputer 110 are directly connected to the AND circuit 700, and hence it is preferable to connect an active device such as a transistor or a FET (field effect transistor) between the outports of the microcomputer 110 and the AND circuit.

Still other embodiment of a circuit breaker in accordance with the present invention is described with reference to FIG. 9, FIG. 10, FIG. 11 and FIG. 12.

In this embodiment, elements having the same numerals serve the same purpose and have the same function, the circuit breaker does not comprise phase selecting circuit 900 and the outputs of the burden circuits 41, 42 and 43 are respectively entered to the signal conversion circuits 901, 902 and 903 and also the level discriminating circuit 151. The output of the level discriminating circuit 151 is entered to the time-current operating circuit 150.

Figure 10:
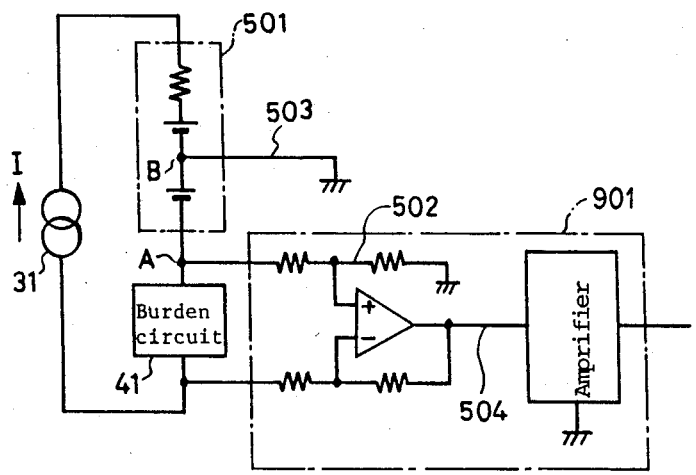
FIG. 10 is a circuit diagram showing a preferred embodiment of an electric power source 501 shown in FIG. 9.

One embodiment of the electric power source 501 is shown in FIG. 10. In the figure, the burden circuit 41 is connected to the negative terminal of the electric power source 501. When the currents flow in each phase of power lines 10, the current transformers 21, 22 and 23 produce output currents at the predetermined transforming ratio, and the output currents are rectified by the full-wave rectifiers 31, 32 and 33, respectively. The rectified output currents of the full-wave rectifiers 31, 32 and 33 are fed to burden circuits 41, 42 and 43, respectively, and also applied to the electric power source 501 which is directly connected to the burden circuits 41, 42 and 43 at the same time. As the current transformers 21, 22 and 23 are regarded as electric power sources, the secondary output currents of the current transformer 21, 22 and 23 are not changed regardless the increasing of the load of the electric power source.

One of the burden circuits, for example, 41 and the signal conversion circuit 901 are shown in FIG. 10. In the figure, the output of the wave rectifier 31 is shown as an equivalent current I. The current I is transformed to voltage signal by the burden circuit 41, and the difference of the voltage is shifted to another voltage signal which is based on the potential of the base point 503 of the electric power source 501 by the operational amplifier 502, and feeds such shifter voltage signal to the terminal 504. The signal transmitting circuit 91 transmits the voltage signal at the terminal 504 to mean or effective value and issues the transmitted mean or effective value. The current I is supplied to the electric power source 501, and the electric power source 501 serves as an electric power source of a control means.

The level discriminating circuit 151 discriminates the level of the largest voltage signal corresponding to the accidental overcurrent induced in the burden circuits 41, 42 and 43, and issues a signal to the time-current operating circuit 150 when the largest voltage is over a previously set level. The time-current operating circuit 150 practices a previously programed time counting operation by receiving the signal from the level discrimination circuit 151 and the thyristor 120 is turned on.

Figure 12:
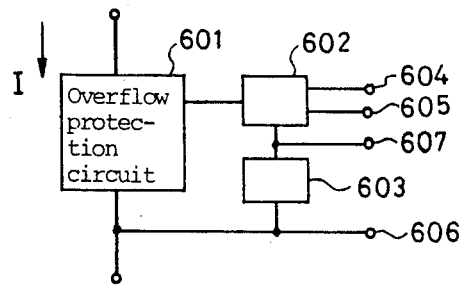
FIG. 12 is a circuit block diagram of the electric power source 501 served as a second burden circuit.

Details of the block diagram of the electric power source 501 which serves as a second burden circuit is shown in FIG. 12. An input-limiting circuit 601 is provided for preventing a positive constant voltage source 602 so as not to generate an overvoltage when the overcurrent is flown into. The positive constant voltage circuit 602 has positive power supplying terminals 604 and 605 for supplying positive electric power to the analog circuits such as the wave transforming circuit and to the digital circuits respectively. A negative constant voltage circuit 603 has a negative power supplying terminal 606 for supplying negative electric power to the analog circuits. Furthermore, the terminal 607 supplies base potential.

Figure 11:
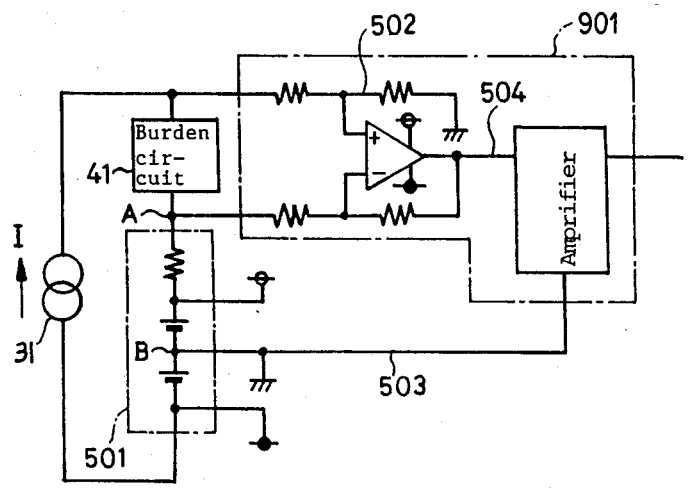
FIG. 11 is a circuit diagram showing another preferred embodiment of the electric power source 501 shown in FIG. 9.

In this embodiment, the electric power source 501 is serially connected to the burden circuits 41, 42 and 43, and the base potential of signal detection (the potential of the point A in FIG. 10 and FIG. 11) does not coincide with the base potential of the electric power source 501 (the potential of the point B in FIG. 10 and FIG. 11). Since the signal transforming circuits 901, 902 and 903 and the level discriminating circuit 151 is based on the base potential of the electric power source 501, it is necessary to shift the base potential for signal detection to the base potential of the electric power source 501. As such shifting means, the signal transforming circuits 901, 902 and 903 respectively comprise a level shifting circuit 502 which consists of an operational amplifier as shown in FIG. 10 and FIG. 11. The level shifting circuit 502 shifts the potential difference of the burden circuit 41 to the base potential of the electric power source 501 (the potential of the point B in FIG. 10 and FIG. 11) and issues to the terminal 504.

Figure 13:
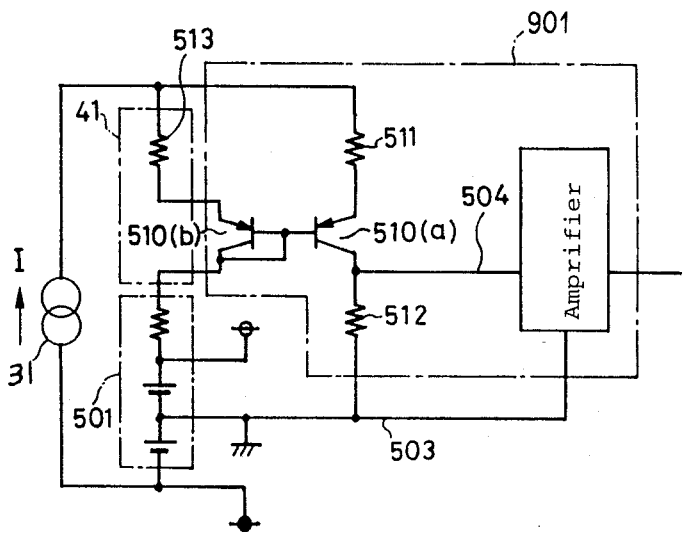
FIG. 13 is a circuit diagram of a current mirror circuit which serves as a level shifting circuit.

Another embodiment of the level shifting circuit consists of the current mirror circuit is shown in FIG. 13. In the figure, a known current mirror circuit is constituted by transistors 510a and 510b, and the current mirror circuit issues a current flow corresponding to a ratio defined by the current value flowing in the burden circuit 41 and the resistance value of the resistor 511 as collector current of the transistor 510a. The resistor 512 transforms such collector current of the transistor 510a to a voltage signal and issues to the voltage signal to the terminal 504.

Figure 14:
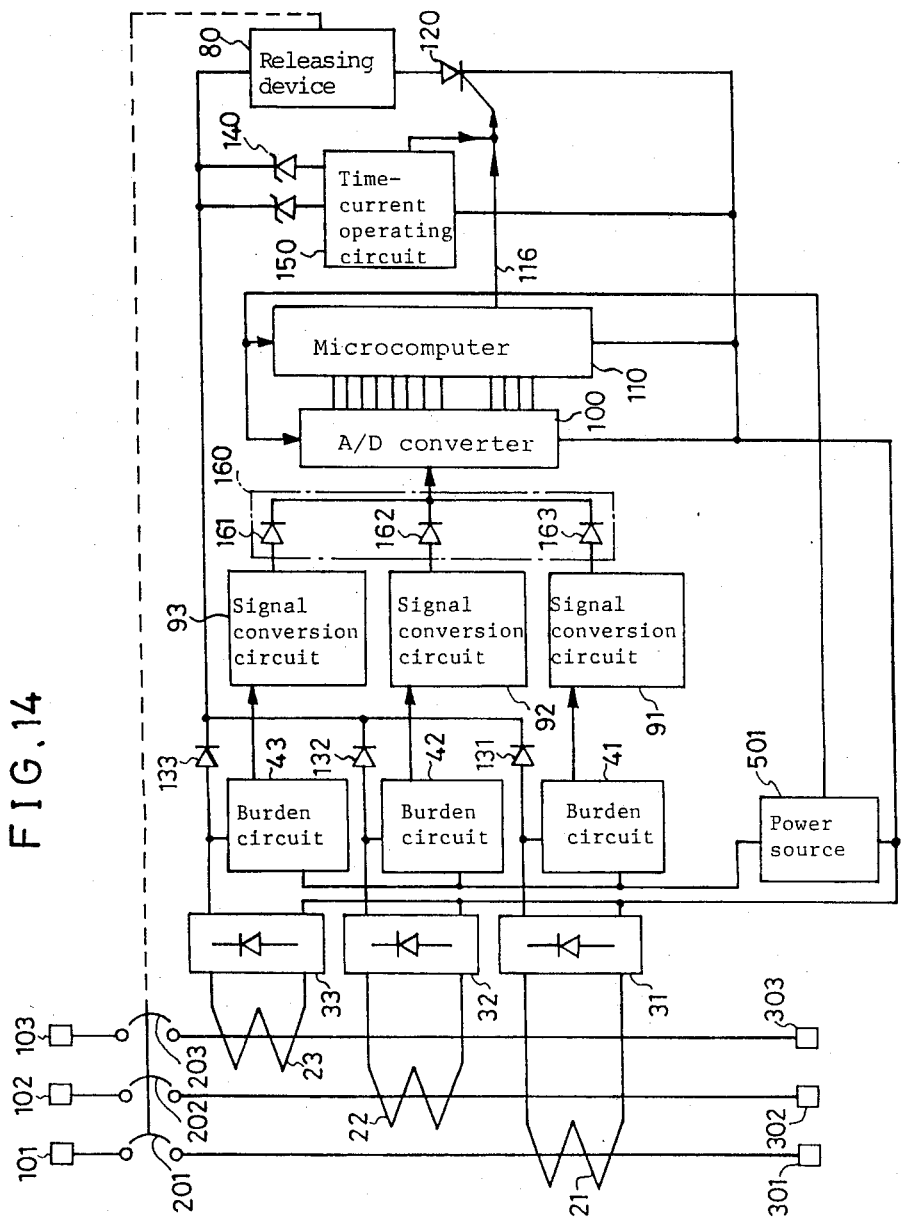
FIG. 14 is a circuit block diagram showing still other preferred embodiment of a circuit breaker in accordance with the present invention.
Figure 15:
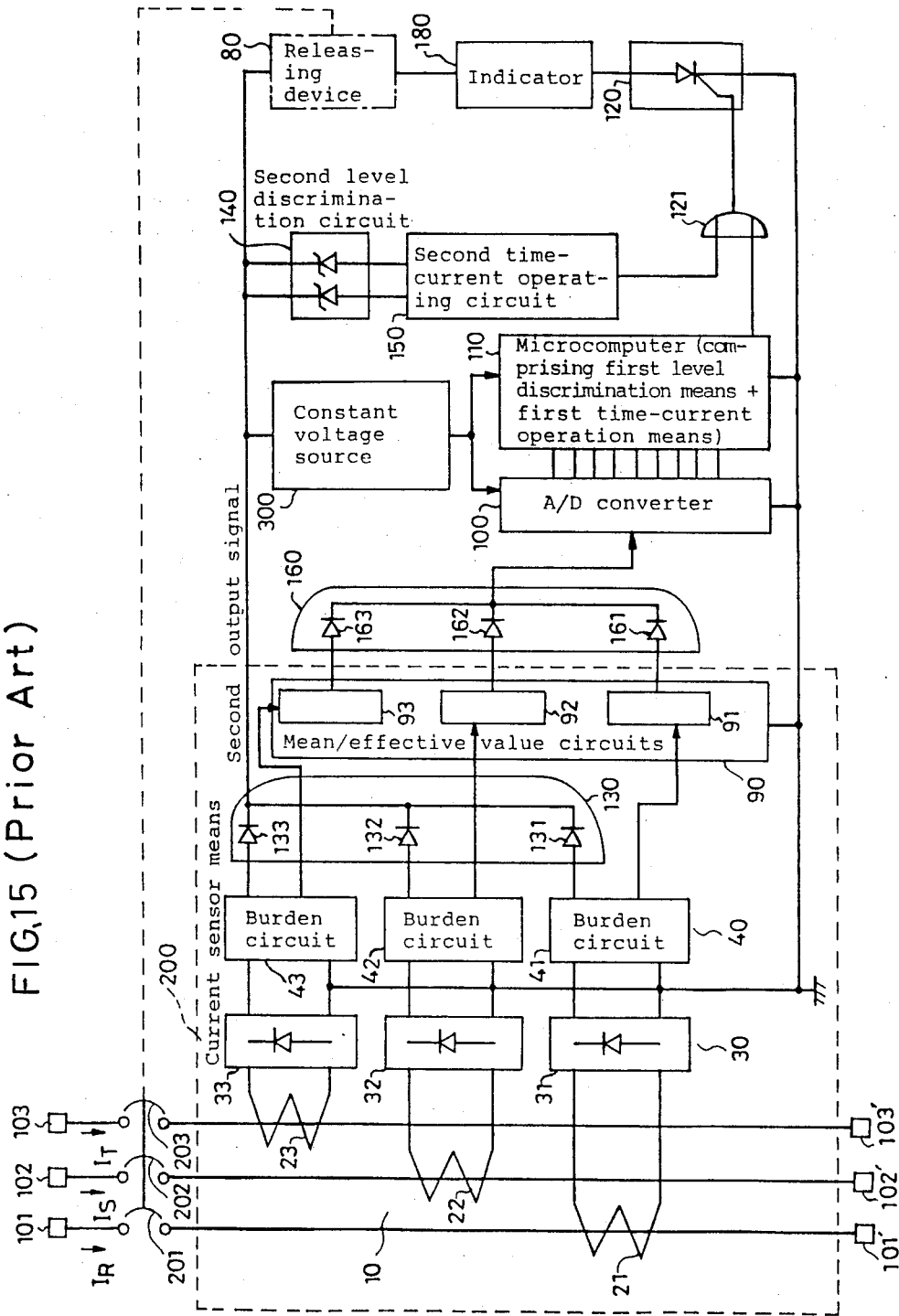
FIG. 15 is the circuit block diagram showing the circuit breaker of the prior art.

Still another preferred embodiment of a circuit breaker is shown in FIG. 14. In this embodiment, elements having the same numerals as the above-mentioned embodiments serve same purpose, and the electric power source 501 is serially connected to the positive terminals of the burden circuits 41, 42 and 43. Other constructions and operations are the same as the above-mentioned embodiment shown in FIG. 9.

What is claimed is:

1. A circuit breaker for a multiple phase A.C. power line comprising:
   at least one disconnectable contact means provided in said A.C. power line, current sensor means for respective phases of said A.C. power line for detecting a value of current flowing therein, secondary output signal generating means for generating secondary output signals corresponding to the current value of said respective phases sensed by said current sensor means, phase selecting means for selecting and outputting the largest among said secondary output signals corresponding to the respective current value of the selected phase of said current sensor means and making said selection by using a predetermined operating characteristic corresponding to a selected threshold value, signal conversion means for obtaining a mean or effective value of the selected and outputted secondary output signal of said phase selecting means, and processing means for processing an output signal of said signal conversion means to generate a release signal for disconnecting said contact means in said power line.

2. A circuit breaker in accordance with claim 1, wherein
said current sensor means comprises direct current transforming means.

3. A circuit breaker in accordance with claim 1, wherein
said processing means provides plural outputs by AND logic and said release signal is provided by said AND logic of said plural outputs.

4. A circuit breaker in accordance with claim 3, wherein
said plural outputs of said processing means are provided by mutually supplemental semiconductor means.

5. A circuit breaker in accordance with claim 1, wherein
said current sensor means includes at least one first burden circuit for each secondary output signal and a second burden circuit which is serially connected to said first burden circuits.

6. A circuit breaker in accordance with claim 5, wherein
said current sensor means includes a level shifting means for shifting a base potential of said first burden circuits.

7. A circuit breaker in accordance with claim 5, wherein
said second burden circuit serves as an electric power source.

8. A circuit breaker in accordance with claim 5, wherein
said first burden circuits are connected to a positive terminal of said second burden circuit.

9. A circuit breaker in accordance with claim 5, wherein
said first burden circuits are connected to a negative terminal of said second burden circuit.

10. A circuit breaker in accordance with claim 6, wherein
said level shifting means is a differential amplifier.

11. A circuit breaker in accordance with claim 6, wherein
said level shifting means is a current mirror circuit.

12. An overcurrent detector for a multiphase A.C. power line comprising:
current sensor means for respective phases of said A.C. power line for detecting a value of current flowing therein, secondary output signal generating means for generating secondary output signals corresponding to the current value of said respective phases sensed by said current sensor means, phase selecting means for selecting and outputting the largest among said second output signals corresponding to the respective current value of the respective phase of said current sensor means and making said selection by using a predetermined operating characteristic corresponding to a selected threshold value, signal conversion means for obtaining a mean or effective value of the selected-outputted secondary output signal of said phase generating means, and processing means for processing an output signal of said signal conversion means to generate a release signal.

13. An overcurrent detector in accordance with claim 12, wherein
said current sensor means comprises direct current transforming means.

14. An overcurrent detector in accordance with claim 12, wherein
said processing means provides plural outputs by AND logic and said release signal is provided by said AND logic of said plural outputs.

15. An overcurrent detector in accordance with claim 14, wherein
said plural outputs of said processing means are provided mutually supplemental semiconductor means.

16. An overcurrent detector in accordance with claim 12, wherein
said current sensor means includes at least one first burden circuit for each secondary output signal and a second burden circuit which is serially connected to said first burden circuits.

17. An overcurrent detector in accordance with claim 16, wherein
said current sensor means includes a level shifting means for shifting a base potential of said first burden circuits.

18. An overcurrent detector in accordance with claim 16, wherein
said second burden circuit serves as an electric power source.

19. An overcurrent detector in accordance with claim 16, wherein
said first burden circuits are connected to a positive terminal of said second burden circuit.

20. An overcurrent detector in accordance with claim 16, wherein
said first burden circuits are connected to a negative terminal of said second burden circuit.

21. An overcurrent detector in accordance with claim 17, wherein
said level shifting means is a differential amplifier.

22. An overcurrent detector in accordance with claim 17, wherein
said level shifting means is a current mirror circuit.

* * * * *